United States Patent

[11] 3,564,334

| [72] | Inventor | George W. Wright<br>4016 W. Palmaire Drive, Phoenix, Ariz. 85021 |
|---|---|---|
| [21] | Appl. No. | 714,626 |
| [22] | Filed | Mar. 20, 1968 |
| [45] | Patented | Feb. 16, 1971 |

[54] CONTROL FOR SLIDE PROJECTORS
4 Claims, 3 Drawing Figs.

[52] U.S. Cl. ................................................ 315/296;
315/312; 315/313; 315/320; 315/322; 353/48;
353/68; 353/108
[51] Int. Cl. ................................................ G05f 1/00,
H05b 37/02
[50] Field of Search.......................................... 315/296,
200, 201, 239, 240, 291, 312, 313, 316, 320, 322;
353/48, 68, 108

[56] References Cited
UNITED STATES PATENTS

| 2,278,222 | 3/1942 | Stansbury..................... | 315/296X |
| 2,515,236 | 7/1950 | Kunins......................... | 315/296X |
| 3,093,030 | 6/1963 | Carrillo........................ | 353/86 |
| 3,282,155 | 11/1966 | Cleary, Jr. et al............ | 353/86 |

*Primary Examiner*—John W. Huckert
*Assistant Examiner*—R. F. Polissack
*Attorney*—Martin L. Stoneman ABSTRACT: A control unit for a pair of cooperating slide projectors. The control unit includes circuit means including a variable transformer for apportioning light power to the slide projectors to provide relatively constant projected screen illumination at all times. The unit also includes switching means for changing slides in a predetermined manner at appropriate times.

INVENTOR
GEORGE W. WRIGHT
ATTORNEY

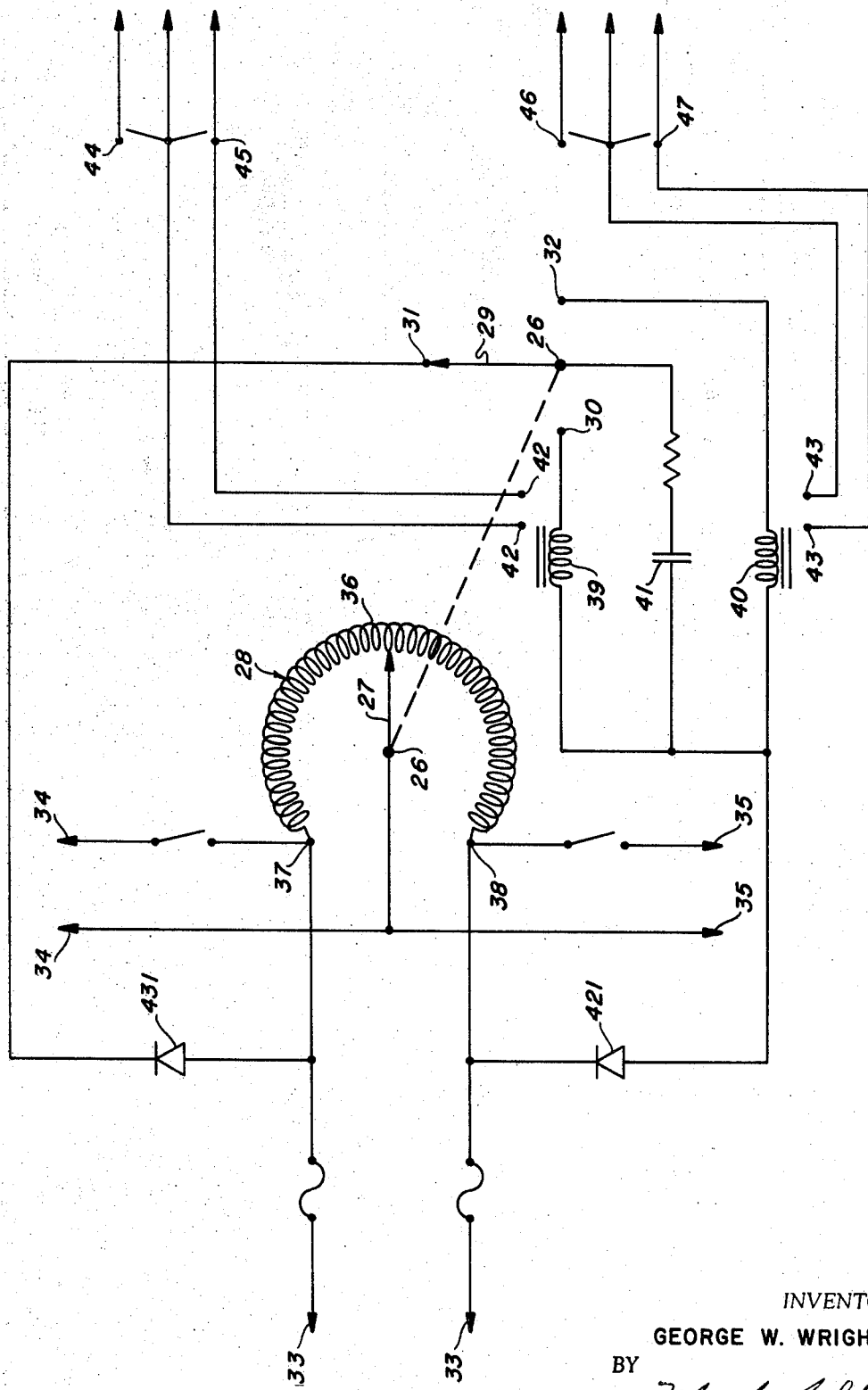

3,564,334

CONTROL FOR SLIDE PROJECTORS

BACKGROUND OF THE INVENTION

This invention relates to slide projection systems.

More particularly, this invention concerns an improved control system for slide projectors.

In a further aspect, the invention relates to an improved control unit for a pair of slide projectors which is especially adapted for projecting slides in a predetermined manner with improved efficiency and minimized visual discomfort to the audience.

In a still further aspect, the invention concerns a control unit of the above type having means for controlling a pair of cooperating slide projectors to maintain relatively constant intensity illumination of the screen used for projection.

Yet another aspect of the invention concerns a control unit of the above type providing means for controlling the slide projectors to provide for changing of slides in a predetermined manner and at the most appropriate times.

The increasingly more frequent use of visual aids by teachers, lecturers, salesmen, instructors, etc. is increasing the need for providing slide projection systems which are efficiently operable by the speaker and either produce the desired effect upon the viewer or, at least, are not disturbing to the viewer. In the use of slide projectors today it is most frequently necessary for the slide projector to be operated by someone other than the speaker, and frequently disturbing communication between the speaker and the operator is necessary. Even in systems operable by the speaker, it is frequently inconvenient for the speaker to handle efficiently the operation of slide changing from his speaker's position. Even on occasions where this can be accomplished, most normally with a pair of slide projectors, there is visual disturbance to the audience created by the impact of each slide change. Much of this disturbance is created by the changing intensity of illumination on the projection screen as one slide image is removed from the screen and another slide image is projected in its place.

Additionally, the factor of relatively high cost of control units for more automatically operating a slide projection system is a factor in the less frequent use of such systems than would be possible with an improved simpler and more economical system.

It would be highly advantageous therefore to provide a slide projector control unit with improved efficiency of operation from the standpoint of the speaker, with minimized visual or other disturbance to the audience, and which is relatively simple in construction and operation.

SUMMARY OF THE INVENTION

It is a principal object of the present invention to provide a control unit for a pair of slide projectors which may be operated directly by the speaker.

Another object of the present invention is the provision of a control unit of the above type which provides for improved efficiency of slide changing.

Still another object of the present invention is the provision of a control unit of the above type providing relatively constant screen illumination and thus minimizing visual disturbance of the audience.

Yet still another object of the present invention is to provide a control unit of the above type which is relatively simple in manufacture and operation.

Briefly, to accomplish the desired objectives of my present invention, in accordance with a preferred embodiment thereof, I provide a control unit for a pair of slide projectors, said control unit comprising circuit means intermediate a power supply and said slide projectors. The control unit includes a rotatable lever connected so that movement thereof may continuously vary the position of a divider tap of a variable transformer so as to divide power, in cooperation with other circuit means, between the projection lamps of the pair of slide projectors. The same lever operates a three-position switch, one position being at each end of the lever movement and one position being intermediate the ends. Circuit means are provided in cooperation with each end switch position to temporarily close a switch to change a projector slide. The intermediate switch position cooperates with circuit means for preparing the control circuit to operate the switching means at the next end switch position reached.

The control unit of the present invention comprises a control box and a junction box which are provided to operate and control a pair of slide projectors of the type including an outlet for power provision to a projection lamp and an outlet for provision of switching means adapted to operate automatic slide-changing means. The control box includes externally an operating lever arm, a "forward" slide change button for each slide projector, a "reverse" slide change button for each slide projector and appropriate inlets and outlets, all in cooperation with internal circuit means to be described.

Connected to the pivot point of the lever arm is a rotatable shaft connected internally in the control box to the divider arm of a variable transformer and also connected to a three-position switch, one switch position at either extension of the lever arm sweep and one switch position centrally located in the lever arm sweep. The incoming power supply to the control box is divided between a pair of outlets on the control box adapted to be connected one to each projection lamp of the slide projectors. The variable transformer is interposed in the circuit in such manner that an intermediate position of the divider arm on the variable transformer provides equal power to either lamp outlet and the extreme positions provide power to one lamp outlet to the exclusion of the other lamp outlet. The total power to the pair of projection lamps is at all times maintained constant so as to provide relatively constant illumination of the projection screen. The central position of the three-position switch is arranged in the circuit means so as to charge a condenser, and each end position switch is arranged in the circuit means so as to discharge the said charge condenser to operate a corresponding relay. The operation of one relay closes a switch for use in changing slides in one of the slide projectors and the operation of the other relay closes a switch for use in changing slides in the other of the slide projectors. The external forward and reverse buttons operate internal forward and reverse switches to control directly and manually the time and direction of a slide change.

BRIEF DESCRIPTION OF THE DRAWINGS

Further and more specific objects and advantages of the present invention will become readily apparent to those skilled in the art from the following detailed description thereof taken in conjunction with the drawings, in which:

FIG. 3 is a circuit diagram of a preferred circuit for the control means of the present invention.

DESCRIPTION OF THE PREFERRED EMBODIMENT

Figure 1:
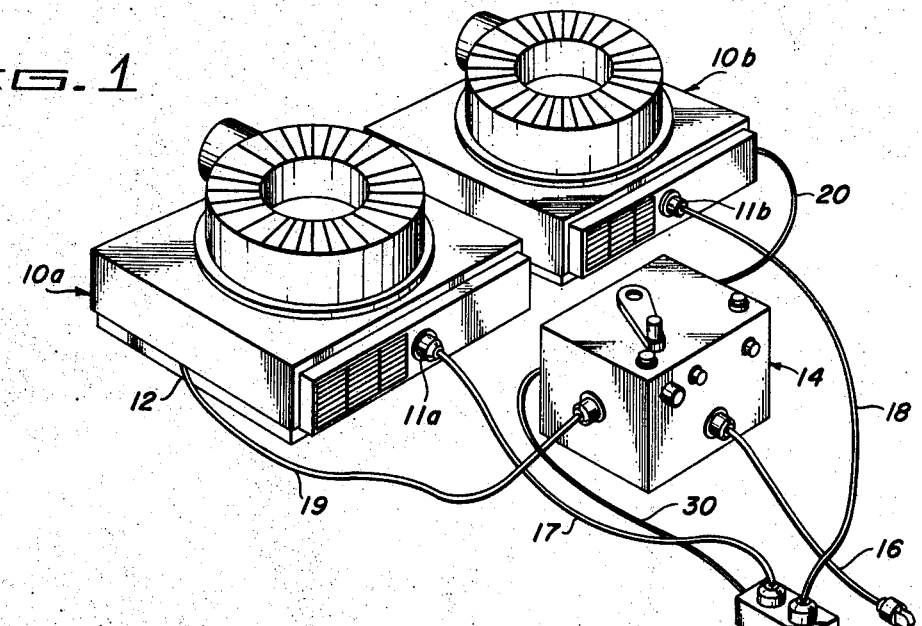
FIG. 1 is a perspective view of the slide projector control system of the present invention.

Turning now to the drawings, in which the same reference numerals indicate corresponding elements throughout the several views, FIG. 1 illustrates a pair of slide projectors 10a and 10b, each having an outlet 11a and 11b for provision of switching means to control slide changing. Each slide projector 10 also includes a connection point 12 for connection of a power source to operate the projector lamp. Also illustrated are junction box 13 and control box 14. Lead 15 is for attachment of junction box 13 to a power source, and lead 16 is for attachment of control box 14 to a power source; lead 17 carried the slide control switching signals from the junction box 13 to outlet 11a of slide projector 10a, and lead 18 carries the slide control switching signals from junction box 13 to outlet 11b of slide projector 10b. Lead 19 carries power from control box 14 to the projection lamp of slide projector 10a;

and lead 20 carries power from control box 14 to the projection lamp of slide projector 10b.

Figure 2:
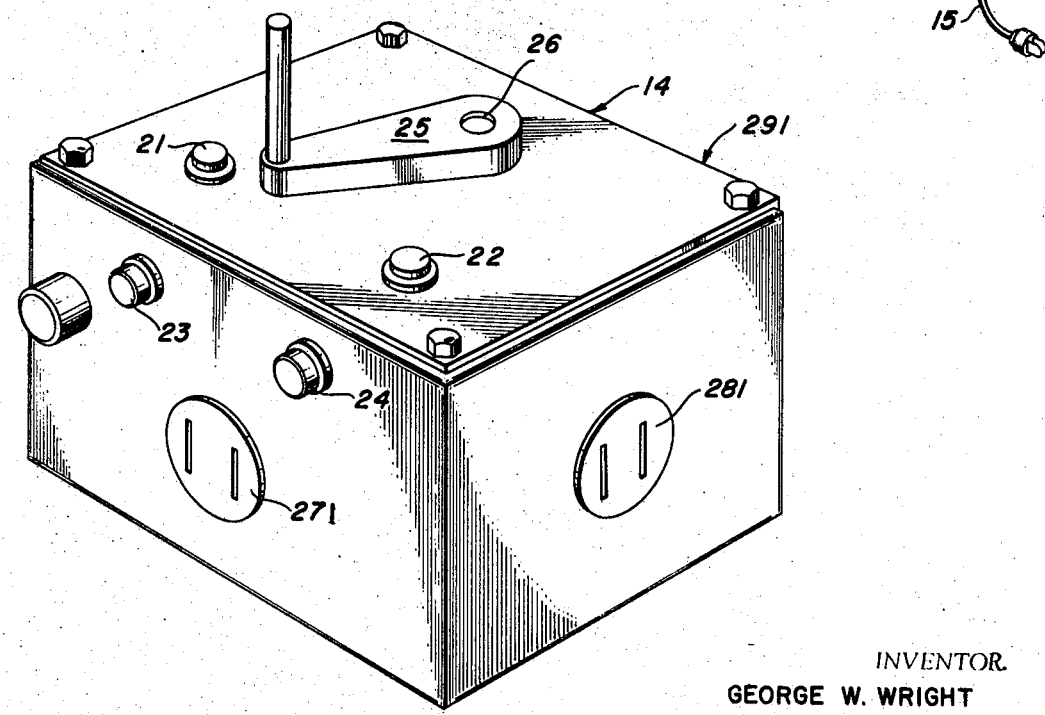
FIG. 2 is an external perspective view of the control box of the present invention.

FIG. 2 illustrates more clearly the external structure of control box 14 of the present invention. Shown are forward switch buttons 21 and 22, reverse switch buttons 23 and 24, manually operable lever arm 25 connected to shaft 26, power source outlet 271, and a pair of oppositely located lamp control outlets 281 (only one is visible in FIG. 2). To the rear of control box 14, not shown but opposite outlet 271, is outlet 291 for the connecting cable 301 between control box 14 and junction box 13 which carries switching signals for use in slide control of the slide projectors 10a and 10b.

With reference to FIG. 3, which is a circuit diagram of the interior of control box 14, it is noted that shaft 26 is shown at two points in the circuit. Rotation of shaft 26 serves both to move divider arm 27 of variable transformer 28, and also to move three-position switch 29 into selective electrical contact with either contact point 30, 31, or 32. The incoming power source from lead 16 is shown in the circuit at 33—33. The outlet leads of the shown circuit connected to lead 19 for providing projection lamp power to slide projector 10a are shown at 34—34. Power leads 35—35 are connected to lead 20 for providing power for the projection lamp of slide projector 10b. Movement of divider arm 27 along windings 36 of variable transformer 28 divides the incoming power from leads 33—33 between leads 34—34 and 35—35 in a continuous manner, depending upon the position of divider arm 27. With divider arm 27 touching point 37 of variable transformer 28, it is seen that substantially all the incoming power is directed to leads 35—35 and, similarly, when divider arm 27 touches point 38 of variable transformer 28, substantially all the incoming power will be directed to leads 34—34.

It is further seen that the total power going to the pair of projection lamps by way of leads 34—34 and 35—35 remains constant for any position of divider arm 27, resulting in relatively constant illumination of the projection screen toward which slide projectors 10a and 10b are aimed, and all that occurs when divider arm 27 is moved is a selection of the relative amount of power passing out through the lamp power leads.

It is further noted that as divider arm 27 passes along windings 36 from point 37 to point 38, the power division between the two lamp power leads will vary continuously from one lamp "full on" to the other lamp "full on" so that no visual disturbance to the audience is created by flickering, or by stopping or starting, or otherwise noticeably altering the illumination of the screen projected upon.

Movement of lever arm 25 from one extreme position to the other turns shaft 26 in such manner as to move divider arm 27 between contact with circuit point 37 and circuit point 38.

Switching signals for slide control of projectors 10a and 10b are provided respectively by relays 39 and 40. The relays 39 and 40 are operated by discharge of condenser 41. From the circuit diagram of FIG. 3, it is clear that when switch 29 is in contact with contact point 31, condenser 41 will become charged. The direct current to charge condenser 41 is provided by the insertion of diodes 421 and 431 in the circuit. The construction and arrangement of control box 14 is such that switch 29 is in this contact position with contact point 31 at the same time that divider arm 27 is approximately halfway between points 37 and 38. When switch 29 comes into contact with point 30, it is seen that condenser 41 will discharge, thereby operating DC relay 39 and temporarily closing switch leads 42—42. Similarly, it is seen that when switch 29 is in contact with contact point 32, condenser 41 will discharge and operate DC relay 40, thereby temporarily closing switch leads 43—43.

When divider arm 27 is in contact with point 37, switch 29 is in contact with point 30; and when divider arm 27 is in contact with point 38, switch 29 is in contact with point 32. Thus it is seen that, in operation of the present invention, when lever arm 25 is made to sweep from one end position to another, each time divider 27 reaches point 37, the power supply will all be directed to leads 35—35 to the projection lamp in slide projector 10b, and relay 39 will close, providing an electrical signal for changing a slide in slide projector 10a. Similarly, when divider arm 27 is moved into position with point 38, the projection lamp in slide projector 10a will be completely turned on, and relay 40 will close, providing a switching signal for slide changing in slide projector 10b.

It will be seen that switch 45 will be closed when forward switch button 21 is depressed, thus producing the same forward switching as is produced by the operation of relay 39. Thus, forward switch button 21, when depressed, will serve to move one slide forward in projector 10a. SImilarly, the depression of forward switch button 22 closes switch 47, and may be manually operated to move one slide forward in slide projector 10b. Reverse switch button 23 operates switch 44, which serves as the reverse switch for "backing up" one slide in projector 10a. Similarly, reverse switch button 24 operates switch 46 for "backing up" one slide in slide projector 10b.

Various changes in the device herein shown for purposes of illustration will readily occur to persons skilled in the art. Such modifications and variations, while not explicitly denoted in the foregoing detailed specification, do not deviate from the teachings of the present invention and are intended to be included in the spirit and scope thereof, which is limited only by a fair interpretation of the following claims.

I claim:

1. In a control unit adapted to control a pair of slide projectors of the type including a projection lamp and switch means for automatically changing slides, said switch means being operable by input switch signals: circuit means for transmitting electrical power from a power supply to each of said pair of projection lamps, said circuit means including at least one variable inductance and being adapted to divide the power from said power supply between said pair of projection lamps continuously throughout the range of possible ratios; a shaft means which is manually rotatable; connecting means between said shaft means and said circuit means constructed and arranged so that rotation of said shaft means varies said variable inductance; and position switch means operable by rotation of said shaft means, said position switch means being so constructed and arranged as to provide switch signals adapted to operate said switch means for automatically changing slides; said position switch means comprising a three-position switch, one position at each end of rotation of said shaft means and one position intermediate in said rotation.

2. The control unit of claim 1 wherein said variable inductance comprises a variable transformer.

3. The control unit of claim 1 wherein said position switch means is so constructed and arranged that an electromagnetic relay is operated at each said end switch position and a condenser, adapted to operate at least one said relay when said condenser is discharged, is charged at said intermediate switch position.

4. The control unit of claim 3 wherein said variable inductance comprises a variable transformer.